(12) United States Patent
Shim et al.

(10) Patent No.: US 9,305,517 B2
(45) Date of Patent: Apr. 5, 2016

(54) APPARATUS AND METHOD FOR ENHANCING PHOTOREALISM OF COMPUTER GRAPHIC IMAGE

(75) Inventors: Hyun Jung Shim, Seoul (KR); Seung Kyu Lee, Seoul (KR); Do Kyoon Kim, Yongin-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 68 days.

(21) Appl. No.: 13/471,994

(22) Filed: May 15, 2012

(65) Prior Publication Data

US 2012/0293539 A1 Nov. 22, 2012

Related U.S. Application Data

(60) Provisional application No. 61/486,843, filed on May 17, 2011.

(30) Foreign Application Priority Data

Feb. 3, 2012 (KR) .......................... 10-2012-0011132

(51) Int. Cl.
  *G09G 5/02* (2006.01)
  *G06T 19/20* (2011.01)
  *G06T 11/00* (2006.01)

(52) U.S. Cl.
  CPC ................ *G09G 5/02* (2013.01); *G06T 11/001* (2013.01); *G06T 19/20* (2013.01); *G06T 2219/2012* (2013.01)

(58) Field of Classification Search
  None
  See application file for complete search history.

(56) References Cited

U.S. PATENT DOCUMENTS

| 8,542,918 | B2* | 9/2013 | Bryant et al. | 382/167 |
| 2007/0154084 | A1* | 7/2007 | Kang et al. | 382/162 |
| 2007/0211959 | A1* | 9/2007 | Hayaishi | 382/274 |
| 2008/0279467 | A1* | 11/2008 | Liu et al. | 382/254 |
| 2009/0040542 | A1* | 2/2009 | Furui et al. | 358/1.9 |
| 2010/0129001 | A1* | 5/2010 | Tsukada | 382/254 |
| 2010/0158369 | A1 | 6/2010 | Kondo | |
| 2011/0157213 | A1* | 6/2011 | Takeyama et al. | 345/590 |
| 2012/0007877 | A1* | 1/2012 | Butler | 345/589 |

FOREIGN PATENT DOCUMENTS

| JP | 2005-92410 | 4/2005 |
| JP | 2007-336218 | 12/2007 |
| JP | 2009-33463 | 2/2009 |
| JP | 2009-232418 | 10/2009 |
| KR | 10-2001-0113791 | 12/2001 |
| KR | 10-2005-0036700 | 4/2005 |
| KR | 10-2006-0045441 | 5/2006 |

* cited by examiner

*Primary Examiner* — Xiao Wu
*Assistant Examiner* — Mohammad H Akhavannik
(74) *Attorney, Agent, or Firm* — Harness, Dickey & Pierce, P.L.C.

(57) ABSTRACT

An apparatus and method for enhancing photorealism of a computer graphic (CG) image. Since color distribution maps of the CG image and a realistic image are extractable, a color distribution map of an input CG image may be adjusted, thereby enhancing photorealism of the CG image.

18 Claims, 6 Drawing Sheets

APPARATUS AND METHOD FOR ENHANCING PHOTOREALISM OF COMPUTER GRAPHIC IMAGE

CROSS-REFERENCE TO RELATED APPLICATIONS

This application claims the priority benefit under 35 U.S.C. §119(e) of U.S. Provisional Application No. 61/486,843, filed on May 17, 2011, in the U.S. Patent and Trademark Office, and the priority benefit under 35 U.S.C. §119(a) of Korean Patent Application No. 10-2012-0011132, filed on Feb. 3, 2012, in the Korean Intellectual Property Office, the entire disclosure of both of which is incorporated herein by reference.

BACKGROUND

1. Field

Example embodiments of the following disclosure relate to an apparatus and method for enhancing photorealism of a computer graphic (CG) image, and more specifically, to an apparatus and method for enhancing photorealism of a CG image by adjusting a color distribution map.

2. Description of the Related Art

Computer graphics (CG) data occupying a major portion of 3-dimensional (3D) content is being actively applied to image content, such as, animations, movies, television programs, and the like.

The CG data is highly compatible with a super multiview display or a hologram display expected as a future 3D display. Recently, a process for obtaining realistic data in a CG data form and a process for rendering CG data are raised as a major display processing technology.

A CG image has an excellent display compatibility. However, accuracy and photorealism of the CG image may be unsatisfactory in comparison to those of a realistic image, even though various modeling and rendering methods are applied.

The photorealism of the CG may depend on cognitive factors related to lighting, shadows, reflections, and the like of an image. According to a conventional method for enhancing photorealism of a CG image, the cognitive factors are altered and adjusted. That is, an operator has to directly correct and manipulate the CG image so as to enhance the photorealism.

SUMMARY

Additional aspects and/or advantages will be set forth in part in the description which follows and, in part, will be apparent from the description, or may be learned by practice of the invention.

According to an aspect of the present disclosure, there is provided a method of enhancing a computer graphic (CG) image, the method including receiving an input of a CG image, obtaining a color distribution map of the input CG image, and adjusting the color distribution map of the input CG image based on a color distribution map of a pre-stored realistic image group and a color distribution map of a pre-stored CG image group.

The obtaining may include obtaining chroma components and luminance components related to pixel values of the input CG image, and obtaining a model constant representing the input CG image based on the chroma components and the luminance components.

The obtaining may include converting red, green, and blue (RGB) data related to the CG image to color space data, calculating an average hue and a distribution vector from the color space data, and obtaining a color distribution map based on the average hue and the distribution vector of the CG image.

The method may further include obtaining a color distribution map from an image group including at least one CG image and a color distribution map from an image group including at least one realistic image, and databasing the obtained color distribution maps.

The obtaining of the color distribution maps related to the CG image group and the realistic image group may include obtaining chroma components and luminance components related to pixel values of the input CG image and obtaining chroma components and luminance components related to pixel values of the realistic image, and obtaining a model constant representing the CG image group based on the chroma components and the luminance components of the CG image group and obtaining a model constant representing the realistic image group based on the chroma components and the luminance components of the realistic image group.

The adjusting may include adjusting the color distribution map of the CG image to be beyond a threshold range of the color distribution map of the CG image group and within a threshold range of the color distribution map of the realistic image group.

The adjusting of the color distribution map of the input CG image may be performed by an equation shown below:

$$\hat{I} = \underset{\hat{I}}{\mathrm{argmin}} C_{photo} \times \|f_{photo} - \hat{I}\|_{L2} - C_{graphics} \times \|f_{graphics} - \hat{I}\|_{L2} + C_{smooth} \times \|I - \hat{I}\|_{L2}$$

wherein, $f_{photo}$ denotes the color distribution map of the CG image group, $f_{graphics}$ denotes the color distribution map of the realistic image group, I denotes an input image, $\hat{I}$ denotes a resultant image, $C_{photo}$ denotes a scalar value with respect to an average hue of the realistic image, $C_{graphics}$ denotes a scalar value with respect to an average hue of the CG image group, and $C_{smooth}$ denotes a scalar value with respect to an average hue of the input CG image.

According to another aspect of the present disclosure, there is provided a method for enhancing photorealism of a CG image, the method including grouping CG images and grouping realistic images, obtaining a color distribution map related to the grouped CG images and obtaining a color distribution map related to the grouped realistic images, and databasing the obtained color distribution maps.

According to another aspect of the present disclosure, there is provided an apparatus for enhancing photorealism of a CG image, the apparatus including an inputting unit to receive an input of a CG image, a color distribution map obtaining unit to obtain a color distribution map from the input CG image, and a color correcting unit to adjust a color distribution map of the input CG image based on a color distribution map of a pre-stored CG image group and a color distribution map of a pre-stored realistic image group.

The apparatus may further include a database (DB) to store a color distribution map of a CG image group including at least one CG image and a color distribution map of a realistic image group including at least one realistic image.

The DB may include a CG color distribution map storage to store the color distribution map of the CG image group, a realistic color distribution map storage to store the color distribution map of the realistic image group, and a threshold range storage to store a threshold range value for adjusting the color distribution map of the input CG image based on the color distribution map of the CG image group and the color distribution map of the realistic image group.

The apparatus may further include a CG image group storage to store at least one CG image, and a realistic image group storage to store at least one realistic image.

The color distribution map obtaining unit may include a data converter to convert RGB data related to the CG image to color space data, a calculator to calculate an average hue and a distribution vector from the color space data and to obtain a color distribution map based on the calculated average hue and distribution vector.

The color correcting unit may adjust the color distribution map of the input CG image to be beyond a threshold range of the color distribution map of the CG image group and within a threshold range of the color distribution map of the realistic image group.

The color correcting unit may correct a color of the CG image by moving a color distribution map on a color space by rotating a reference axis related to a distribution vector according to an average hue and the distribution vector of the input CG image.

According to another aspect of the present disclosure, there is provided an apparatus for enhancing photorealism of a CG image, the apparatus including a CG color distribution map storage to store a color distribution map of a CG image group, a realistic color distribution map storage to store a color distribution map of a realistic image group, and a threshold range storage to store a threshold range value for adjusting a color distribution map of an input CG image based on the color distribution map of the CG image group and the color distribution map of the realistic image group.

According to another aspect of the present disclosure, there is provided a method for enhancing photorealism for a CG image, including receiving an input of a CG image; extracting a color distribution map of the input CG image; adjusting the color distribution map of the input CG image, based on a color distribution map of collected CG images that are grouped and a color distribution map of collected realistic images that are grouped.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
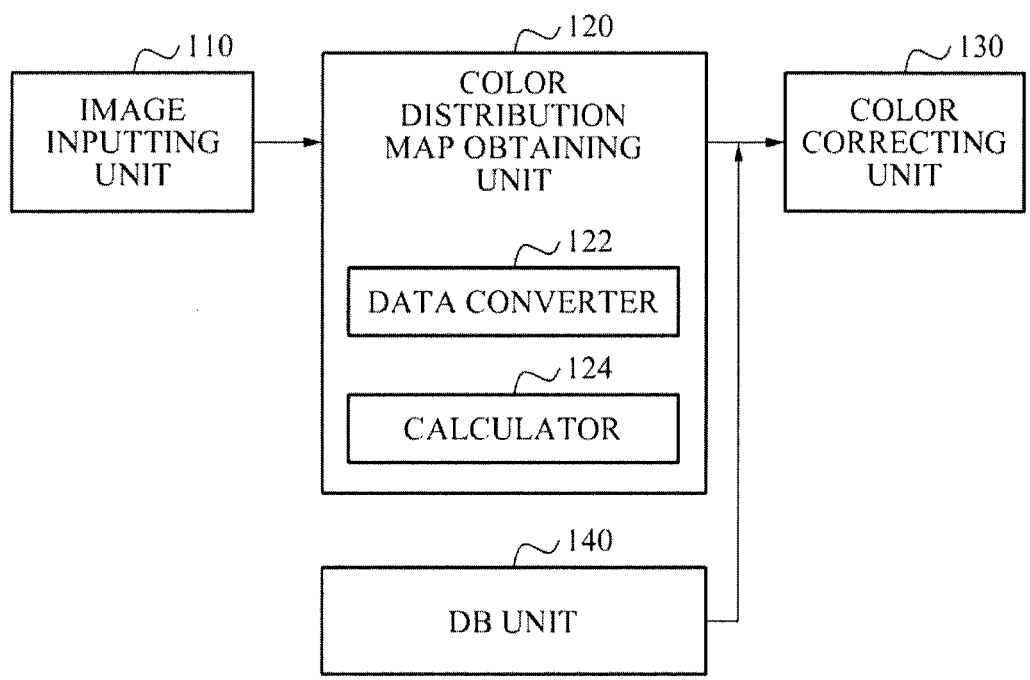
FIG. 1 illustrates an apparatus for enhancing photorealism of a computer graphic (CG) image, according to an example embodiment of the present disclosure.

Reference will now be made in detail to exemplary embodiments of the present disclosure, examples of which are illustrated in the accompanying drawings, wherein like reference numerals refer to the like elements throughout. Exemplary embodiments are described below to explain the present disclosure by referring to the figures.

A method for enhancing photorealism of a computer graphic (CG) image, according to an embodiment of the present disclosure, may compare a color distribution map related to image groups including a plurality of realistic images and a plurality of CG images with a color distribution map related to an input CG image, thereby adjusting the color distribution map related to the input CG image.

Here, a plurality of collected realistic images and a plurality of collected CG images are grouped into a realistic image group and a CG image group, respectively. Color distribution maps of the realistic image group and the CG image group are obtained. The obtained color distribution maps may be used for enhancement of photorealism of the input CG image.

To enhance photorealism of the input CG image, the method may include obtaining the color distribution map of the input CG image, and adjusting the color distribution map of the input CG image to be similar to the color distribution map of the realistic image group but different from the color distribution map of the CG image group.

FIG. 1 is a diagram illustrating an apparatus 100 for enhancing photorealism of a CG image, according to an example embodiment of the present disclosure.

Referring to FIG. 1, the photorealism enhancing apparatus 100 for a CG image may include an image inputting unit 110, a color distribution map obtaining unit 120, a color correcting unit 130, and a database (DB) unit 140.

The image inputting unit 110 is input with a CG image. The CG image input to the image inputting unit 110 may include an object produced by CG.

The color distribution map obtaining unit 120 may obtain a color distribution map of the CG image inputted to the image inputting unit 110.

The color distribution map obtaining unit 120 may include a data converter 122 and a calculator 124.

The data converter 122 may convert red, green, and blue (RGB) data of the input CG image to color space data that includes chroma components and luminance components. For example, the data converter 122 may convert an input CG image on RGB color coordinates to the color space data that includes chroma information and luminance information, such as, a YCbCr color space, a Lightness Chrominance Hue (LCH) color space, an La*b* color space.

YCbCr is used to separate out a luma signal (Y) that can be stored with high resolution or transmitted at high bandwidth, and two chroma components ($C_B$ and $C_R$) that can be bandwidth-reduced, subsampled, compressed, or otherwise treated separately for improved system efficiency.

The conversion of the input CG image into the color space data is performed to adjust not only saturation but also luminance of a hue of the input CG image when the color of the input CG image is adjusted. Hereinafter, embodiments will be described about a case in which RGB color signal data is converted into data of a Commission internationale de i'eclairage (CIE) Lab color space with respect to the input CG image.

The calculator 124 may calculate an average hue, a distribution vector, and a maximum value and minimum value of a hue of the input CG image from the color space data generated by the data converter 122. The calculator 124 may obtain the color distribution map based on the average hue, the distribution vector, and the maximum and minimum value. Here, a single average hue or distribution vector may be obtained per image. Alternatively, the average hue or the distribution vector may be sets of average values obtained by dividing the input image into areas according to a context or a hue cluster and calculating the average values per area.

The calculator 124 may express the input CG image in the form of a 3-dimensional (3D) color vector corresponding to each pixel of the input CG image.

The calculator 124 may calculate average values of colors constituting the input CG image and average values of vectors of a color expressed on the color space, in the 3D color space. The calculator 124 may obtain the color distribution map based on the average hue and average vector in the color space related to the input CG image.

The color distribution map may be obtained in the form of Gaussian distribution. In addition, the color distribution map may be obtained in the form of a look-up table.

Figure 3:
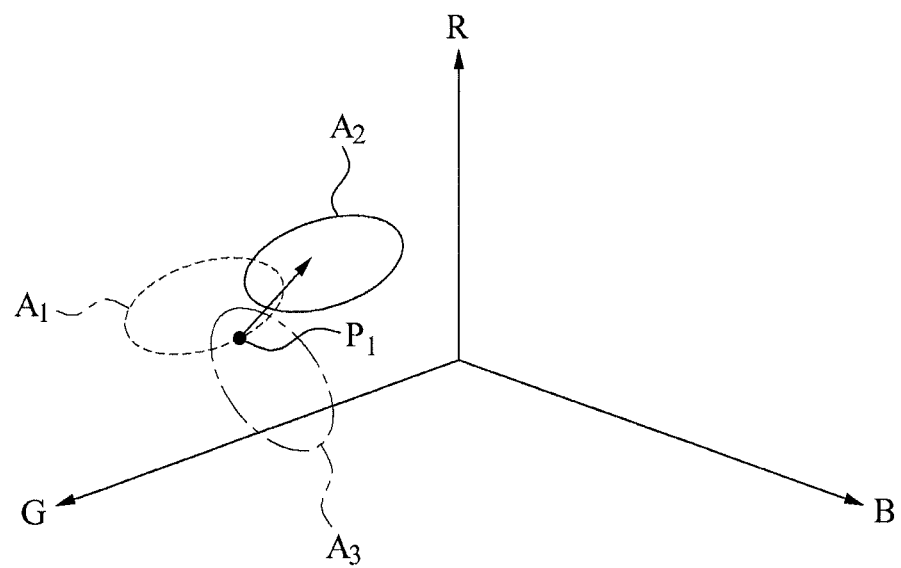
FIG. 3 illustrates examples of a color distribution map of a CG image group, a color distribution map of a realistic image group, and a color distribution map of an input CG image, according to the example embodiment of FIG. 1.

Examples of a color distribution map of a CG image group, a color distribution map of a realistic image group, and a color distribution map of the input CG image are shown in FIG. 3.

FIG. 3 illustrates examples of the color distribution map of the CG image group, the color distribution map of the realistic image group, and the color distribution map of the input CG image, according to the example embodiment of FIG. 1.

The average hue, the distribution vector, and the maximum and minimum values of the hue of the color of the input CG image may be expressed on the color space as shown by a color distribution map $A_3$ in FIG. 3. The color distribution map $A_3$ of the input CG image may include a point P1 related to the average hue and the average vector.

The color correcting unit 130 may perform various types of image correction, such as, color enhancement, color matrix, and color array interpolation, with respect to the input CG image by referencing the color distribution map obtained by the color distribution map obtaining unit 120. That is, the color correcting unit 130 may perform color correction of the input CG image through the color enhancement.

The color correcting unit 130 may perform color correction of the input CG image by referencing the color distribution map of the realistic image group and the color distribution map of the CG image group which are pre-stored in the DB unit 140.

The DB unit 140 may store the color distribution map of the realistic image group and the color distribution map of the CG image group. The DB unit 140 may store the color distribution map obtained from the CG image group including at least one CG image, and the color distribution map obtained from the realistic image group including at least one realistic image. The DB unit 140 may store a threshold range for adjusting the color distribution map of the input CG image, based on the color distribution map of the CG image group and the color distribution map of the realistic image group.

The DB unit 140 may be separately provided from the photorealism enhancing apparatus 100 for the CG image. In an example embodiment, the DB unit 140 may be described as a DB apparatus for color correction of a CG image.

Figure 2:
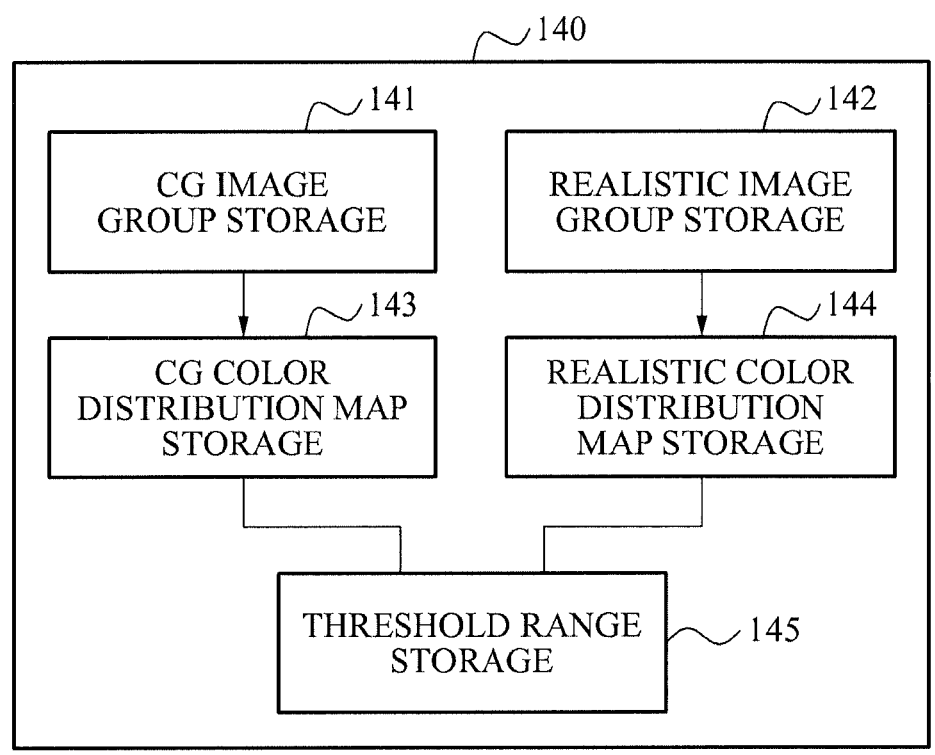
FIG. 2 illustrates a database (DB) apparatus for enhancing photorealism of a CG image, according to the example embodiment of FIG. 1.

FIG. 2 illustrates the DB apparatus 140 for color correction of a CG image.

Referring to FIG. 2, the DB apparatus 140 may include a CG image group storage 141, a realistic image group storage 142, a CG color distribution map storage 143, a realistic image color distribution map storage 144, and a threshold range storage 145.

The CG image group storage 141 may store a plurality of CG images each including a CG image label among a plurality of images collected from the Internet or the outside.

The realistic image group storage 142 may store a plurality of realistic images each including a realistic image label among the plurality of images collected from the Internet or the outside.

The pluralities of CG images and realistic images may be grouped according to the labels into the realistic image group and the CG image group. The realistic image group and the CG image group may be stored in the realistic image group storage 142 and the CG image group storage 141, respectively.

The CG image group storage 141 and the realistic image group storage 142 may be provided in the DB apparatus 140 or another separate storage apparatus.

The CG color distribution map storage 143 may store a color distribution map related to the plurality of CG images stored in the CG image group storage 141.

The realistic color distribution map storage 144 may store a color distribution map related to the plurality of realistic images stored in the realistic image group storage 142.

The CG color distribution map storage 143 may store a color distribution map including the same color signal data as the color distribution map of the input CG image with respect to the collected CG images.

That is, the CG color distribution map storage 143 may store the color distribution map obtained based on the average hue and the average vector from the color signal data of the CG image converted to color space signal data.

In addition, the realistic color distribution map storage 144 may store a color distribution map including the same color signal data as the color distribution map of the input CG image and the color distribution map of the realistic image group, with respect to the collected realistic images.

That is, the realistic color distribution map storage 144 may store the color distribution map obtained based on the average hue and the average vector from the color signal data of the realistic image converted to CIELab color space signal data.

The color distribution map of the CG image group and the color distribution map of the realistic image group may be separated using a general support vector machine. The support vector machine may separate the image groups, except a noise and an overlapping section, from the color distribution map of the CG image group and the color distribution map of the realistic image group. An example of the support vector machine may be expressed by Equation 1.

$$[w, b, \alpha] = \min_{w,b,\alpha} \left\{ \frac{1}{2}\|w\|^2 - \sum_i \alpha_i [y_i(w \cdot x_i - b) - 1] \right\} \quad \text{[Equation 1]}$$

Here, x denotes data related to the color distribution maps of the CG image group and the realistic image group. w, b, and α denote support vectors. y denotes an indicator function indicating the labels of the respective image groups.

The color distribution maps stored in the CG color distribution map storage 143 and the realistic color distribution map storage 144 may also be expressed by the Gaussian distribution. The color distribution map of the CG image group and the color distribution map of the realistic image group may be expressed as shown by example views $A_1$ and $A_2$ in FIG. 3.

The color distribution map $A_1$ of the CG image group may include a plurality of points having the average hue and the average vector with respect to the plurality of CG images included in the CG image group. The color distribution map $A_2$ of the realistic image group may include a plurality of points having the average hue and the average vector with respect to the plurality of realistic images included in the realistic image group.

The threshold range storage 145 may store a threshold range for adjusting the color distribution map of the input CG image based on the color distribution map of the CG image group and the color distribution map of the realistic image group.

The threshold range storage 145 may store an adjustment range according to adjustment of the color distribution map of the input CG image with respect to the color distribution map of the CG image group and the color distribution map of the realistic image group. For the adjustment range, values related to a distance range to the color distribution map of the CG image group and related to a closeness range to the color distribution map of the realistic image group may be stored.

The color correcting unit 130 may adjust the color distribution map of the input CG image based on the color distribution map of the CG image group and the color distribution map of the realistic image group stored in the DB unit 140.

The color correcting unit 130 may adjust the color distribution map on a color space by rotating a reference axis related to the average vector according to the average hue and the average vector of the input CG image. According to a result of an adjustment of the color distribution map, an overall hue of the input CG image or a hue of a particular color may be adjusted.

That is, as shown by the example color distribution map in FIG. 3, the color distribution map $A_1$ of the CG image group, a color distribution map $A_2$ of the realistic image group, and the color distribution map $A_3$ of the input CG image may include Gaussian distribution maps, in an oval shape.

The color distribution map $A_3$ of the input CG image may include the point $P_1$ that includes the average hue and the average vector of the input CG image. The point $P_1$ belonging to an area of the color distribution map $A_1$ of the CG image group may be moved to an area of the color distribution map $A_2$ of the realistic image group.

To adjust the average hue, the reference axis of the average vector may be rotated, such that the point $P_1$ including the average hue and the average vector of the color distribution map $A_3$ of the input CG image is moved to be in a threshold range of the color distribution map $A_2$ of the realistic image group. In addition, the adjusted color distribution map $A_3$ of the input CG image may be moved beyond a threshold range of the color distribution map A1 of the CG image group.

That is, the color distribution map of the input CG image may be adjusted to be positioned within the threshold range close to the color distribution map of the realistic image group and the threshold range close to the color distribution map of the CG image group.

The aforementioned adjustment of the color distribution map of the input CG image may be defined by Equation 2.

$$\hat{I} = \mathrm{argmin}_{\hat{I}} C_{photo} \times \|f_{photo} - \hat{I}\|_{L2} - \quad \text{[Equation 2]}$$

-continued
$$C_{graphics} \times \|f_{graphics} - \hat{I}\|_{L2} + C_{smooth} \times \|I - \hat{I}\|_{L2}$$

Here, $f_{photo}$ denotes the color distribution map of the CG image group or a modeling function related to the color distribution map of the CG image group, $f_{graphics}$ denotes the color distribution map of the realistic image group or a modeling function related to the color distribution map of the realistic image group, I denotes an input image, $\hat{I}$ denotes a resultant image, $C_{photo}$ denotes a scalar value with respect to an average hue of the realistic image, $C_{graphics}$ denotes a scalar value with respect to an average hue of the CG image group, and $C_{smooth}$ denotes a scalar value with respect to an average hue of the input CG image. In addition, L2 denotes an Euclidian distance, that is, a mean square error value.

$f_{photo}$ and $f_{graphics}$ may be expressed by support vectors or a linear discriminative analysis method.

Figure 6:
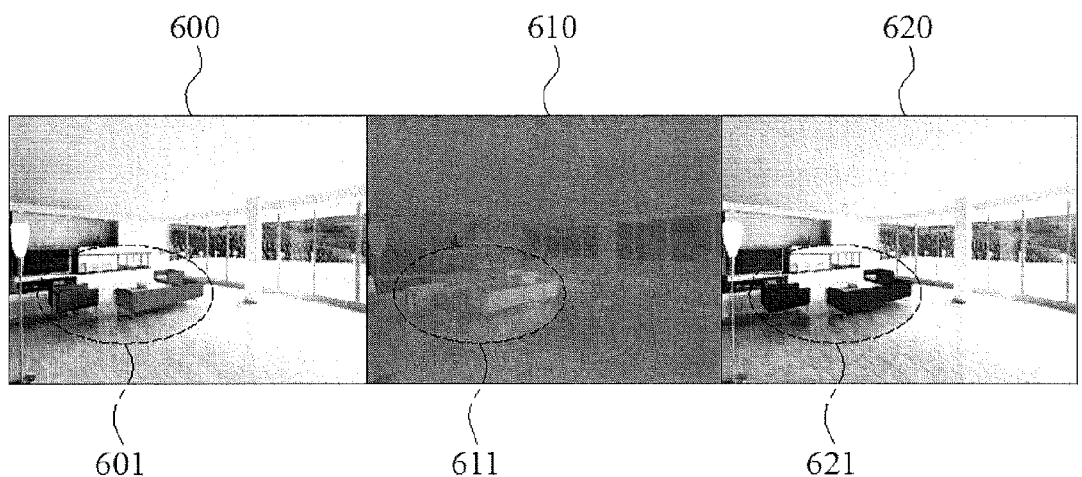
FIG. 6 is a diagram illustrating a result of processing, related to enhancement of photorealism of a CG image, according to an example embodiment of the present disclosure.

As aforementioned, when the color distribution map of the input CG image is adjusted based on the color distribution map of the CG image group and the color distribution map of the realistic image group, which are pre-stored, and the input CG image may be expressed as shown in FIG. 6.

FIG. 6 illustrates a result of processing related to enhancement of photorealism of a CG image, according to an example embodiment of the present disclosure.

Referring to FIG. 6, a reference numeral 600 denotes an example of the CG image input to the image inputting unit 110. A reference numeral 610 denotes an example process of processing for enhancing photorealism of the input CG image. A reference numeral 620 denotes an example image to which color correction processing is applied to enhance photorealism of the input CG image of the process 610.

The color correcting unit 130 of the photorealism enhancing apparatus 100 may move the color distribution map on the color space by rotating the reference axis with respect to the average vector according to the average hue and the average vector of the input CG image, thereby correcting the color of the CG image.

That is, the photorealism enhancing apparatus 100 may obtain the color distribution map including the average hue and the average vector of the input CG image. Next, the photorealism enhancing apparatus 100 may adjust the color distribution map of the input CG image based on the obtained color distribution map, the color distribution map including the average hue and the average vector of the pre-stored CG image group, and the color distribution map including the average hue and the average vector of the pre-stored realistic image group.

FIG. 6 shows an example result of adjusting the color distribution map with respect to the input CG image 600. That is, color correction is performed with respect to a color 601 included in the input CG image as shown by reference numeral 611 and the color correction result is shown by reference numeral 621 of the adjusted image 620. Reference numeral 620 of FIG. 6 shows an example difference of the input CG image 600 and the adjusted image 620.

Figure 4:
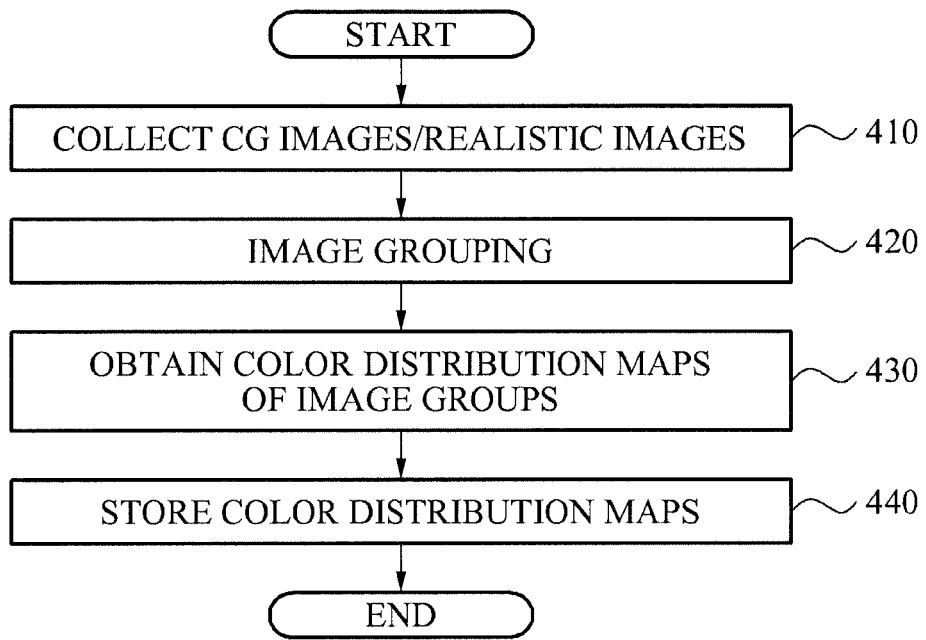
FIG. 4 is a flowchart illustrating a method for obtaining and databasing a CG image group and a realistic image group, according to an example embodiment of the present disclosure.

FIG. 4 illustrates a method for obtaining and storing data stored in the DB unit, according to an example embodiment of the present disclosure.

The method shown in FIG. 4 may be performed by the photorealism enhancing apparatus 100 shown in FIG. 1.

Referring to FIG. 4, in operation 410, the photorealism enhancing apparatus 100 may collect at least one CG image and at least one realistic image from the web or the outside.

In operation 420, the photorealism enhancing apparatus 100 may group the collected images into the CG image group and the realistic image group. That is, the photorealism enhancing apparatus 100 may group the CG images and the realistic images in operation 420.

In operation 430, the photorealism enhancing apparatus 100 may obtain a color distribution map related to the CG image group and a color distribution map related to the realistic image group. That is, in operation 430, the photorealism enhancing apparatus 100 may obtain chroma components and luminance components related to pixel values of the CG image, and obtain chroma components and luminance components related to pixel values of the realistic image. Furthermore, in operation 430, the photorealism enhancing apparatus 100 may obtain a model constant representing the CG image group based on the chroma components and the luminance components of the CG image group, and obtain a model constant representing the realistic image group based on the chroma components and the luminance components of the realistic image group. For example, the model constant may be a function representing the color distribution map or a support vector of an image group.

In operation 440, the photorealism enhancing apparatus 100 may store the obtained CG image group and realistic image group.

Figure 5:
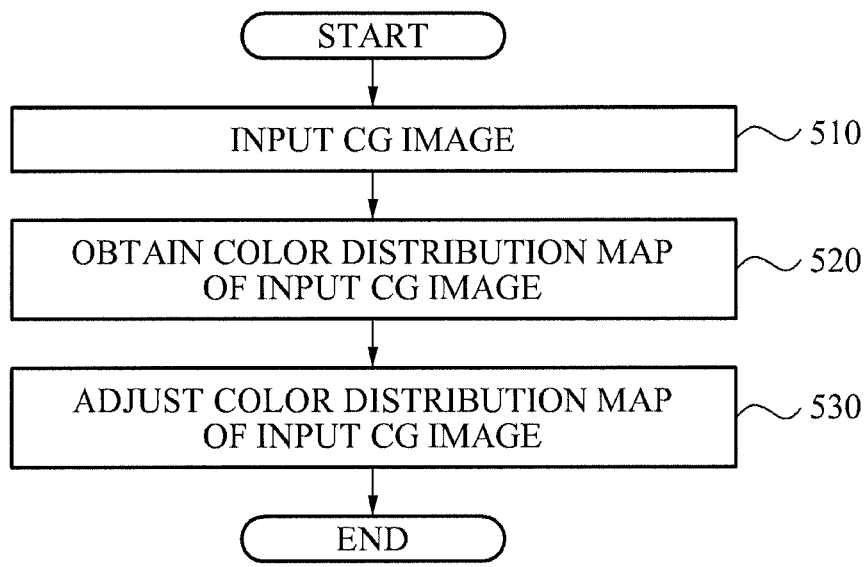
FIG. 5 is a flowchart illustrating a method for enhancing photorealism of a CG image, according to an example embodiment of the present disclosure.

FIG. 5 illustrates a method for enhancing photorealism of a CG image, according to an example embodiment of the present disclosure.

The method shown in FIG. 5 may be performed by the photorealism enhancing apparatus 100 of FIG. 1.

Referring to FIG. 5, the photorealism enhancing apparatus 100 may be input with a CG image in operation 510.

In operation 520, the photorealism enhancing apparatus 100 may obtain a color distribution map of the input CG image, and obtain chroma components and luminance components related to pixel values of the input CG image. In operation 520, the photorealism enhancing apparatus 100 may obtain a model constant representing the input CG image based on the chroma components and the luminance components. In addition, in operation 520, the photorealism enhancing apparatus 100 may convert RGB data to color space data. An average hue and an average vector may be calculated from the color space data. In addition, the photorealism enhancing apparatus 100 may obtain a color distribution map based on the calculated average hue and average vector in operation 520.

In operation 530, the photorealism enhancing apparatus 100 may adjust the color distribution map of the input CG image based on a color distribution map of a pre-stored CG image group and a color distribution map of a pre-stored realistic image group. In operation 530, the photorealism enhancing apparatus 100 may adjust the color distribution map of the input CG image not to be included in a threshold range of the color distribution map of the CG image group but included in a threshold range of the color distribution map of the realistic image group. In addition, in operation 530, the photorealism enhancing apparatus 100 may correct the color of the input CG image by moving the color distribution map on a color space, by rotating a reference axis related to the average vector according to the average hue and the average vector of the input CG image.

Color distribution maps related to a CG image and a realistic image may be extracted. Accordingly, photorealism of the images may be enhanced by adjusting a color distribution map related to an input CG image.

According to exemplary embodiments, since the color distribution maps of the CG image and the realistic image are extractable, the color distribution map of the input CG image may be adjusted, thereby enhancing photorealism of the CG image to be near a realistic image.

In addition, since the color distribution maps of the CG image and the realistic image are extractable, an input CG image may be rendered, appropriately, for a realistic image. In addition, photorealism of the CG image to be applied to a 3D image may be enhanced through post-processing.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Further, according to an aspect of the embodiments, any combinations of the described features, functions and/or operations can be provided.

Moreover, the apparatus for enhancing photorealism may include at least one processor to execute at least one of the above-described units and methods.

Although a few exemplary embodiments of the present disclosure have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of enhancing a computer graphic (CG) image, the method comprising:
  receiving, by a processor, an input of the CG image;
  obtaining a color distribution map of the input CG image; and
  adjusting the color distribution map of the input CG image by rotating a reference axis related to an average vector according to an average hue and the average vector of the input CG image such that a point including the average hue and the average vector is within a threshold range of a color distribution map of pre-stored realistic image group in lieu of a threshold range of a color distribution map of a pre-stored CG image group,
  wherein the color distribution map of the input CG image is adjusted to be positioned within the threshold range close to the color distribution map of the realistic image group.

2. The method of claim 1, wherein the obtaining comprises:
  obtaining chroma components and luminance components related to pixel values of the input CG image; and
  obtaining a model constant representing the input CG image based on the chroma components and the luminance components.

3. The method of claim 1, wherein the obtaining comprises:
  converting red, green, and blue (RGB) data related to the input CG image to color space data;
  calculating the average hue and the distribution vector from the color space data; and obtaining the color distribution map of the input CG image based on the average hue and the distribution vector of the input CG image.

4. The method of claim 1, further comprising dividing the input CG image into areas, according a context or a hue cluster and calculating an average value per area.

5. The method of claim 1, further comprising:
obtaining a color distribution map from an image group including at least one CG image and a color distribution map from an image group including at least one realistic image; and
databasing the obtained color distribution maps.

6. The method of claim 5, wherein the obtaining of the color distribution maps related to the CG image group and the realistic image group comprises:
obtaining chroma components and luminance components related to pixel values of the input CG image and obtaining chroma components and luminance components related to pixel values of the realistic image; and
obtaining a model constant representing the CG image group based on the chroma components and the luminance components of the CG image group and obtaining a model constant representing the realistic image group based on the chroma components and the luminance components of the realistic image group.

7. The method of claim 1, wherein the adjusting comprises:
adjusting the color distribution map of the input CG image to be beyond the threshold range of the color distribution map of the CG image group and within the threshold range of the color distribution map of the realistic image group.

8. The method of claim 1, wherein the adjusting of the color distribution map of the input CG image is performed by an equation below:

$$\hat{I} = \mathrm{argmin} C_{photo} \times \|f_{photo} - \hat{I}\|_{L2} - $$
$$C_{graphics} \times \|f_{graphics} - \hat{I}\|_{L2} + C_{smooth} \times \|I - \hat{I}\|_{L2}$$

wherein, $f_{photo}$ denotes the color distribution map of the CG image group, $f_{graphics}$ denotes the color distribution map of the realistic image group, I denotes an input image, $\hat{I}$ denotes a resultant image, $C_{photo}$ denotes a scalar value with respect to an average hue of the realistic image, $C_{graphics}$ denotes a scalar value with respect to an average hue of the CG image group, and $C_{smooth}$ denotes a scalar value with respect to an average hue of the input CG image.

9. An apparatus for enhancing photorealism of a computer graphic (CG) image, the apparatus comprising:
an inputting unit to receive an input of the CO image;
a color distribution map obtaining unit to obtain a color distribution map from the input CG image; and
a color correcting unit to adjust a color distribution map of the input CG image,
wherein the color correcting unit rotates a reference axis related to an average vector according to an average hue and the average vector of the input CG image such that a point including the average hue and the average vector is within a threshold range of a color distribution map of pre-stored realistic image group in lieu of a threshold range of a color distribution map of a pre-stored CG image group,
wherein the color distribution map of the input CG image is adjusted to be positioned within the threshold range close to the color distribution map of the realistic image group.

10. The apparatus of claim 9, further comprising:
a database (DB) to store a color distribution map of a CG image group including at least one CG image and a color distribution map of a realistic image group including at least one realistic image.

11. The apparatus of claim 10, wherein the DB comprises:
a CG color distribution map storage to store the color distribution map of the CG image group;
a realistic color distribution map storage to store the color distribution map of the realistic image group; and
a threshold range storage to store a threshold range value for adjusting the color distribution map of the input CG image based on the color distribution map of the CG image group and the color distribution map of the realistic image group.

12. The apparatus of claim 11, further comprising:
a CG image group storage to store at least one CG image; and
a realistic image group storage to store at least one realistic image.

13. The apparatus of claim 9, wherein the color distribution map obtaining unit comprises:
a data converter to convert red, green, and blue (RGB) data related to the input CG image to color space data;
a calculator to calculate the average hue and the distribution vector from the color space data and to obtain a color distribution map based on the calculated average hue and distribution vector.

14. The apparatus of claim 9, further comprising a calculator to divide the input CG image into areas, according a context or a hue cluster and calculating an average value per area.

15. The apparatus of claim 9, wherein the color correcting unit adjusts the color distribution map of the input CG image to be beyond the threshold range of the color distribution map of the CG image group and within the threshold range of the color distribution map of the realistic image group.

16. The apparatus of claim 9, wherein the color correcting unit corrects a color of the input CG image by moving a color distribution map on a color space by rotating a reference axis related to a distribution vector according to an average hue and the distribution vector of the input CG image.

17. The apparatus of claim 9, wherein the color correcting unit corrects the color of the input CG image by an equation below:

$$\hat{I} = \mathrm{argmin} C_{photo} \times \|f_{photo} - \hat{I}\|_{L2} - $$
$$C_{graphics} \times \|f_{graphics} - \hat{I}\|_{L2} + C_{smooth} \times \|I - \hat{I}\|_{L2}$$

wherein, $f_{photo}$ denotes the color distribution map of the CG image group, $f_{graphics}$ denotes the color distribution map of the realistic image group, I denotes an input image, $\hat{I}$ denotes a resultant image, $C_{photo}$ denotes a scalar value with respect to an average hue of the realistic image, $C_{graphics}$ denotes a scalar value with respect to an average hue of the CG image group, and $C_{smooth}$ denotes a scalar value with respect to an average hue of the input CG image.

18. A method for enhancing photorealism of a computer graphics (CG) image, comprising:
receiving an input of a CG image;
extracting a color distribution map of the input CG image; and
adjusting the color distribution map of the input CG image by rotating a reference axis related to an average vector according to the average hue and an average vector of the input CG image such that a point including the average hue and the average vector is within a threshold range of a color distribution map of pre-stored realistic image group in lieu of a threshold range of a color distribution map of a pre-stored CG image group,
wherein the color distribution map of the input CG image is adjusted to be positioned within the threshold range close to the color distribution map of the realistic image group.

* * * * *